United States Patent [19]
Wallestad et al.

[11] Patent Number: 5,417,479
[45] Date of Patent: May 23, 1995

[54] FULL-FUNCTION VALVE FOR HEAVY DUTY SEMI-TRAILER BRAKE SYSTEM

[75] Inventors: Steven D. Wallestad, Kansas City; Robert L. Koelzer, Kearney, both of Mo.

[73] Assignee: Midland Brake, Inc., Kansas City, Mo.

[21] Appl. No.: 149,287

[22] Filed: Nov. 9, 1993

[51] Int. Cl.⁶ .............................. B60T 13/62
[52] U.S. Cl. .......................... 303/7; 303/71; 303/DIG. 2
[58] Field of Search ............ 303/7, 9, 28–30, 303/40, 44, 70, 71, 78, 80, 85, DIG. 1, DIG. 2, 8; 188/170

[56] References Cited

U.S. PATENT DOCUMENTS

| | | | |
|---|---|---|---|
| Re. 30,205 | 2/1980 | Carton et al. | 303/7 |
| 4,042,281 | 8/1977 | Ury | 303/29 |
| 4,080,004 | 3/1978 | Ury | 303/9 |
| 4,163,585 | 8/1979 | Ury | 303/9 |
| 4,182,535 | 1/1980 | Fannin | 303/9 |
| 4,226,482 | 10/1980 | Stable et al. | 303/82 |
| 4,472,001 | 9/1984 | Fannin | 303/9 |
| 4,593,954 | 6/1986 | Campanini | 303/7 |
| 4,915,456 | 4/1990 | Gross et al. | 303/9 |
| 5,236,250 | 8/1993 | Moody et al. | 303/28 X |
| 5,322,353 | 6/1994 | Wallestad | 303/7 |

*Primary Examiner*—Robert J. Oberleitner
*Assistant Examiner*—Alfred Muratori
*Attorney, Agent, or Firm*—St. Onge Steward Johnston & Reens

[57] ABSTRACT

A full function brake valve for a semi-trailer is contained within a single housing and provides ports for receiving supply air and control air, and for delivering and receiving air from reservoirs, service brakes and spring brakes, and delivering air to an exhaust. The internal valves include a pressure protection valve which communicates with a first check valve and a quick release valve to pressurize spring brake chambers, and a reservoir check valve and a relay valve to respectively pressurize a reservoir and to deliver supply air to service brakes. An orifice preferably provided in a second check valve permits partial air flow to the spring brakes to release the spring brakes for towing the vehicle.

18 Claims, 9 Drawing Sheets

FULL-FUNCTION VALVE FOR HEAVY DUTY SEMI-TRAILER BRAKE SYSTEM

BACKGROUND OF THE INVENTION

1. Field of the Invention

This invention relates to an improved full-function brake valve for use in fluid braking systems used on the semi-trailers of highway tractor-trailer vehicles.

2. Discussion of the Prior Art

To meet all of the emergency and service requirements for highway tractor-trailer combinations, while meeting all of the pertinent governmental regulations, including Federal Regulation FMVSS 121 (Docket 90-3, Notice 2), the trucking industry has resorted to a number of trailer brake valve arrangements which have led to complexity, high costs, installation and maintenance difficulties and related problems.

FMVSS 121 is an important safety standard that applies to highway tractor-trailer vehicles; it requires that the spring brakes, which are spring loaded to engage the brake drums when the braking system air pressure drops below the operating pressure necessary to operate the service brakes, become engaged within certain specified time periods. This provides emergency braking when the service brakes become inoperative.

In a typical semi-trailer braking system, a spring brake control valve may be employed to supply pressurized air to the spring brake chambers to release the spring brakes, and also to exhaust air from the spring brake chambers when the spring brakes are to be again applied. The brake system, however, must be designed so that the spring brakes are not released prematurely, that is, prior to pressurization of the reservoir for operating the service brakes. Safety considerations dictate that the service brake function be enabled by such reservoir pressurization prior to release of the spring brakes. However, it is also desirable that the braking system have a reasonably short period to become effective. Otherwise the user may be tempted to defeat the safety system to avoid long delays in start-up of a tractor-trailer rig.

Illustrative of the prior art is Gross et al. U.S. Pat. No. 4,915,456 and patents cited therein, i.e., Ury U.S. Pat. Nos. 4,042,281, 4,080,004 and 4,163,585; Tannin U.S. Pat. No. 4,182,535; and Carton et al. U.S. Pat. Re. 30,205 (Reissue of U.S. Pat. No. 3,922,064). Still other illustrative prior art includes Fannin U.S. Pat. Nos. 4,472,001 and Campanini 4,593,954 and the patents cited therein. None of these patents disclose or suggest a full-function valve having the features of safety provided by the present invention.

Several prior applications have been filed by Applicants herein, including U.S. application Ser. No. 07/939,141, filed Sep. 2, 1992 in the names of Moody and Koelzer, entitled "Full-Function Valve For Heavy Duty Semi-Trailer Brake Systems", and now issued as U.S. Pat. No. No. 5,236,250, and U.S. application Ser. No. 08/013,588, filed Feb. 4, 1993, in the name of Wallestad, the disclosures of which are hereby incorporated by reference.

OBJECTS OF THE INVENTION

It is an object of the present invention to provide within a single valve envelope an improved full-function brake valve for heavy-duty highway trailers which performs all of the required functions of a tractor trailer braking system and otherwise meets all of the requirements of the aforementioned Federal Regulation.

It is another object to provide a full-function brake valve system for heavy-duty highway semi-trailers which can become operational within a relatively short period from provision of supply air pressure to the braking system.

It is another object to provide a single, compact full-function brake valve which can be pneumatically released after emergency braking to permit towing of the vehicle.

Other objects, aspects and features of the present invention in addition to those mentioned above will be pointed out in or will be understood from the following detailed description provided in conjunction with the accompanying drawings.

SUMMARY OF THE INVENTION

The present invention provides a full function valve, comprising a valve housing having a plurality of ports therein, and communicating passageways linking the ports, and internal valves. The ports comprise a supply air inlet, a control air inlet, at least one spring brake outlet, at least one service brake outlet, a reservoir outlet, a spring brake exhaust, and a service brake exhaust, all extending through the outer wall of the housing. The internal valves include a pressure protection valve, first and second check valves, a reservoir check valve, a quick release valve, and a relay valve.

The pressure protection valve is in fluid communication with a passageway connected to the supply air inlet, and is openable at a selected supply air pressure to provide fluid communication between the supply air inlet and the first check valve as well as the reservoir check valve. The first check valve is in fluid communication by a passageway with the quick release valve. The quick release valve (1) provides fluid communication between the supply air inlet and the spring brake outlet when pressure is supplied to an inlet side; and (2) permits the spring brake outlet to be vented to the spring brake exhaust when the inlet pressure is less than the outlet pressure. The reservoir check valve is located in fluid communication between the pressure protection valve and the reservoir outlet. The relay valve is in fluid communication with the control air inlet, and is normally located to provide fluid communication between the service brake outlet and the service brake exhaust. When pressurized control air is supplied thereto the relay valve provides fluid communication between the reservoir and the service brake outlet. The second check valve is located in fluid communication with the supply air inlet and the inlet side of said quick release valve.

An orifice is preferably located in fluid communication between the supply air inlet and the inlet side of the quick release valve. The orifice is sized to provide sufficient supply air to open the quick release valve to a pressurized position, to provide a partial flow of supply air to the spring brake outlet. The orifice preferably comprises an aperture in a valve seat of the second check valve.

An anti-compounding valve is preferably located in a passageway connecting the control air inlet and the supply air inlet. The anti-compounding valve is openable to vent control air pressure to the supply air passageway when supply air is insufficient to open the pressure protection valve.

BRIEF DESCRIPTION OF THE DRAWINGS

The present invention may be more clearly understood from the following description of a specific and preferred embodiment read in conjunction with the accompanying schematic and detailed drawings; wherein.

Figure 1:
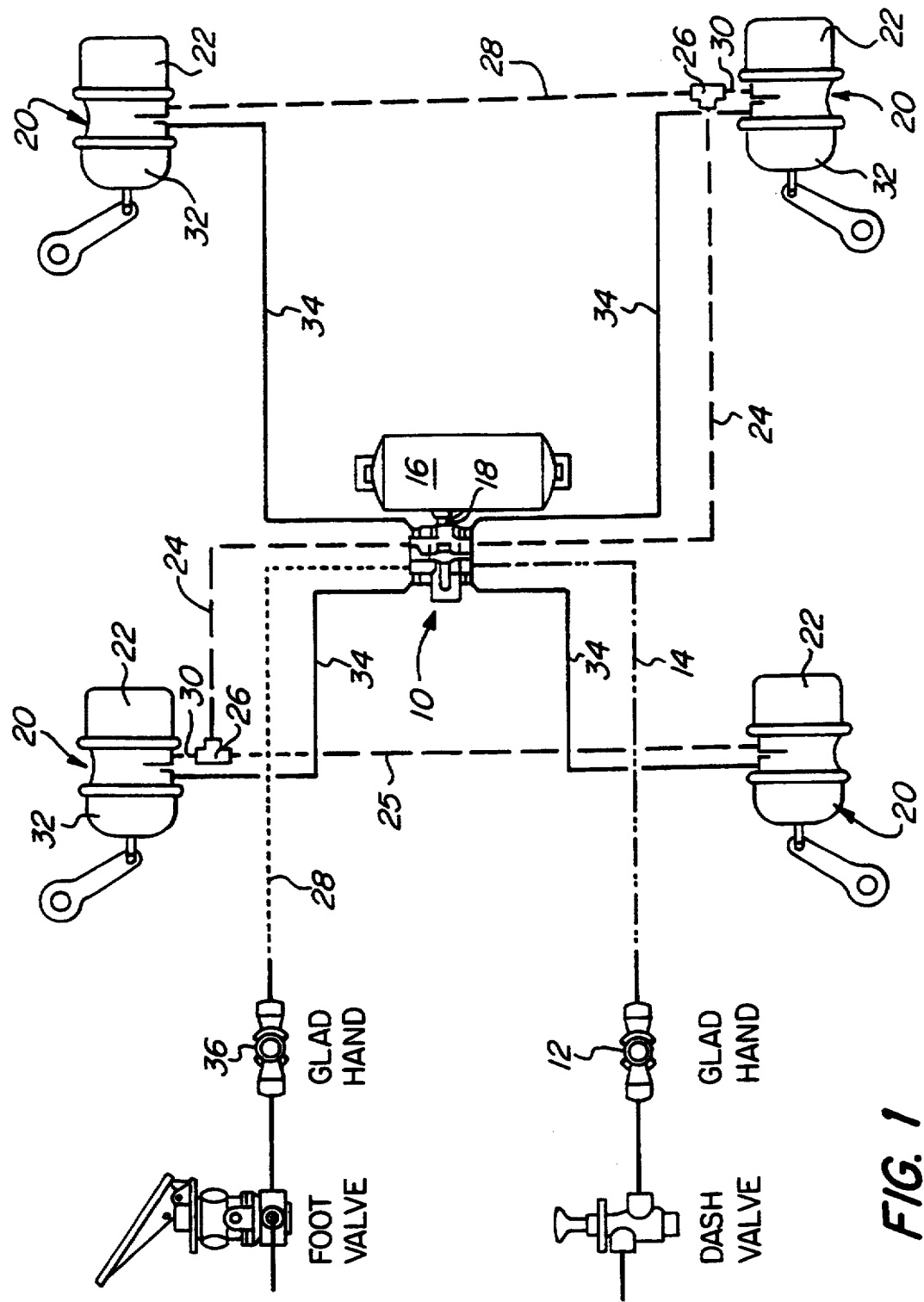
FIG. 1 is an overall schematic of a semi-trailer split brake system using a full-function valve in accordance with the present invention.

It should be understood that the drawings are not necessarily to exact scale and that certain aspects of the embodiments, particularly the functional schematics of FIGS. 2A–2E, are illustrated by graphic symbols, schematic representations and fragmentary views. It should be also understood when referring to physical relationships of components by terms such as "upper", "lower", "upward", "downward", "vertical", "horizontal", "left" "right" or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shaped passage but also encompasses fluid communicating spaces, chambers and the like.

DETAILED DESCRIPTION OF DRAWINGS

Referring to FIG. 1, the schematic represents a semi-trailer tandem brake system including a unitary full-function valve 10 in accordance with the present invention. Pressurized supply air, typically at about 125 psig, is received into the system from a supply source (not shown) of the tractor-trailer combination via trailer gladhand connector 12 and is communicated to full-function valve 10 via line 14.

The pressurized air is directed by valve 10 to reservoir tank 16 via line 18. Pressurized air is also directed by full-function valve 10 to the brake actuators 20, the spring brake chambers 22 thereof being in fluid communication with full-function valve 10 via lines 24, 25, and the service brake chambers 32 of actuators 20 being in fluid communication with full-function valve 10 via lines 34. Control air from the tractor for controlling the service brakes is received via gladhand 36 and communicated to full-function valve 10 via line 28.

The pressurized air which fills the reservoir 16 and actuates the spring and service brakes is referred to herein as "supply air", and the pressurized air which controls the full function valve 10 is referred to herein as "control air".

Initially, upon charging of the brake system, the spring brake chambers 22 of brake actuators 20 receive pressurized air through full-function valve 10 from the tractor via gladhand connector 12 and line 14, while the reservoir 16 is simultaneously pressurized to enable the service brake capability.

In the following detailed descriptions of the schematics of full-function valve 10 in FIGS. 2A–2E, and in FIGS. 3A–D, and 4–6, the same reference numerals are used so that the respective descriptions can be more readily related and understood.

Referring to FIGS. 2A–2E, 3A–D, and 4–6, unitary full-function valve 10 in a trailer brake system is shown.

Supply air line 14 is connected to housing 40 of full-function valve 10 at supply air inlet 42. Control air line 38 is connected to valve housing 40 at control air inlet 44. Line 18 to reservoir 16 is connected to valve housing 40 at reservoir outlet 45. Line 24 to the spring brake chambers 22 is connected to valve housing 40 at spring brake outlet 46. Line 34 to the service brake chambers 32 is connected to housing 40 at service brake outlet 48.

Unitary full-function valve 10 houses within body 40 a plurality of valve assemblies, namely, quick release valve 50, first check valve 52, biased pressure protection valve module 54, second check valve 56, reservoir check valve 57, and relay valve module 58.

Valve 10 preferably also includes an anti-compounding check valve 59 connected by internal (or external) passageways to the control air inlet and the supply air inlet.

The present system provides the safety advantage that the spring brakes of the semi-trailer will not be released unless there is sufficient supply air in the system reservoir to operate the service brakes. This safety feature is achieved by provision for simultaneous filling of the spring brake chambers 22 and reservoir 16. In contrast, some prior art devices filled the spring brake chambers first and then pressurized the reservoir. These prior art devices were less desirable, since it was possible to move the vehicle even though service braking capability was not available. However, the simultaneous filling of spring brake chambers and reservoir of the present system also has disadvantages; for example, if there is a failure of the service brake air and the spring brakes engage the brake drums, it is not possible to pneumatically release them, and they must be manually backed off to permit the trailer to be moved.

In order to eliminate this disadvantage, an orifice 53 preferably is provided. Orifice 53 is located between the inlet side of pressure protection valve 54 and the inlet side of quick release valve 50. Orifice 53 is preferably a small aperture or slot in the valve seat of second check valve 56. Orifice 53 is sized small enough so that it does not alter normal system performance but provides certain distinct advantages if there is a failure of the reservoir 16.

Orifice 53 permits air to flow from the supply air inlet 42 through orifice 53 to the spring brakes 22 while bypassing pressure protection valve 54 and service reservoir 16. This allows the truck operator to release the spring brakes after an emergency stop to permit moving the semi-trailer out of traffic or to a location where it can be repaired. Thus the orifice 53 permits a system as shown in the drawings to have the same convenience as sequential fill prior art systems while retaining the important safety features of the simultaneous fill system of the present invention.

Orifice 53 also permits a partial flow of supply air to open quick release valve 50 and to partially pressurize spring brake chambers 22, without releasing the spring brakes, prior to opening of pressure protection valve 54. Orifice 53 in its preferred embodiment is self-cleaning, since the leakage around second check valve 56 will tend to blow any obstructions out of orifice 53. It is to be appreciated that orifice 53 may take various forms as disclosed herein, and may be a passageway or even a valved aperture.

Figure 2A:
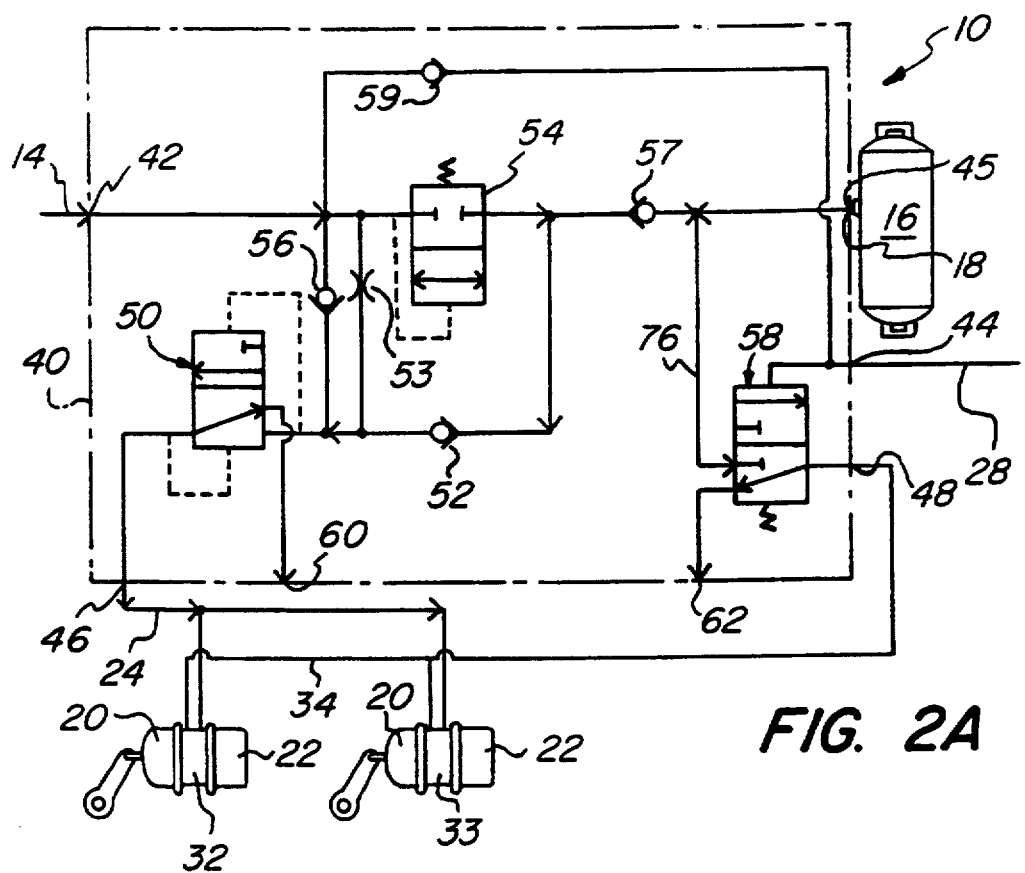
FIGS. 2A–2E are functional schematics of the full-function valve system of the present invention illustrating various functional modes of the valve during the charging of the brake system and subsequent braking cycles.
Figure 3A:
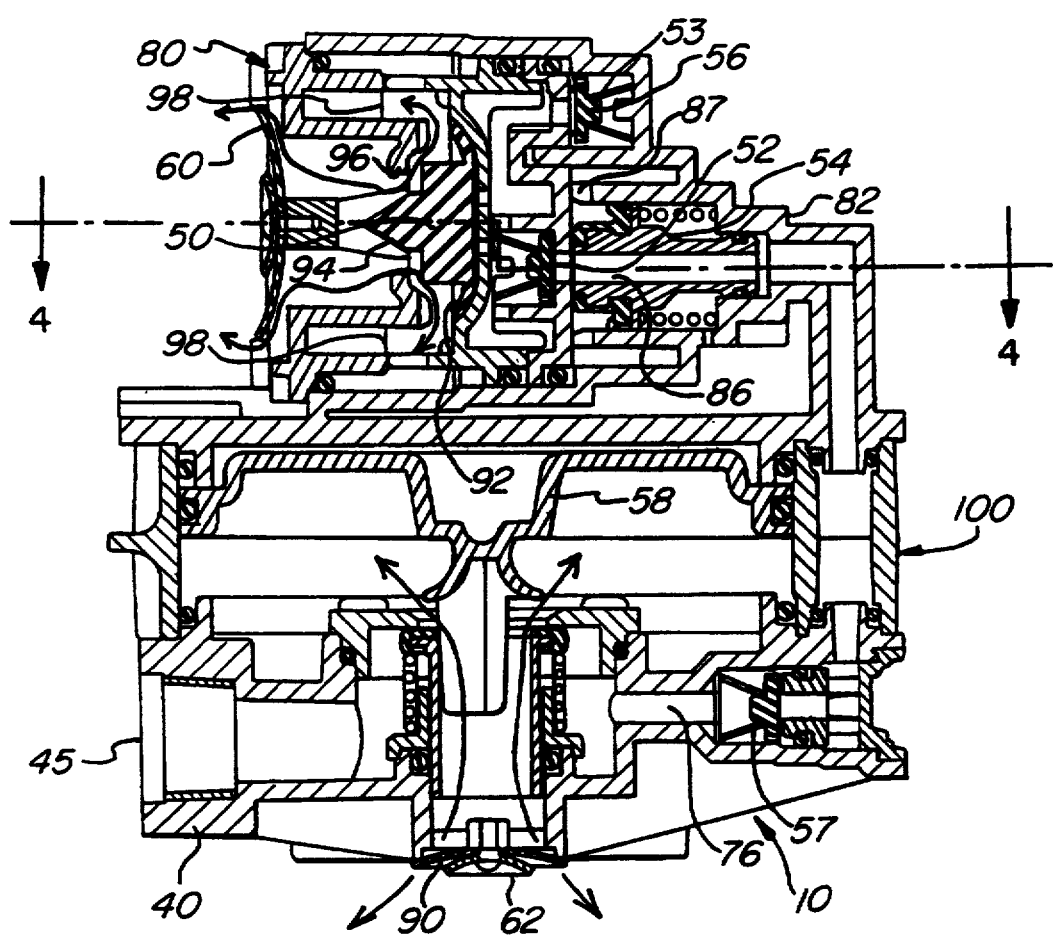
FIGS. 3A–3D are cross-sectional elevational views of an embodiment of a full function valve in accordance with the invention in the functional modes corresponding to the functional modes shown in schematic FIGS. 2A–2D.
Figure 4:
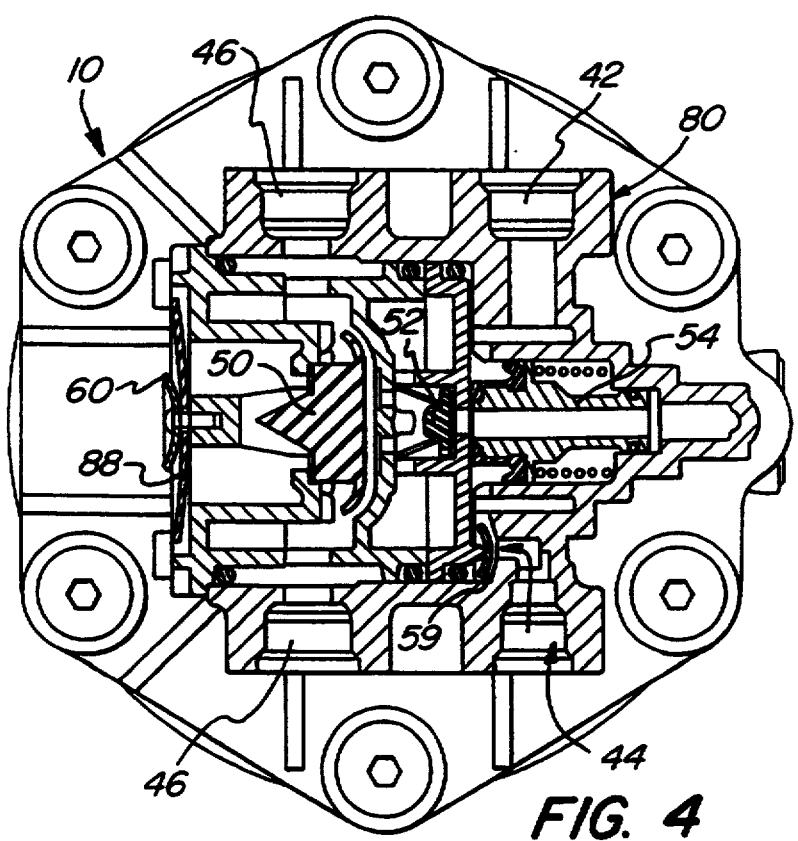
FIG. 4 is a cross-sectional top plan view of the full function valve shown in FIG. 3A.

Referring now to FIGS. 2A, 3A and 4, service brake chambers 32 are vented to the atmosphere. Spring brakes 22 are also vented to the atmosphere and are therefore applied. Supply line 14, control line 28, reservoir line 18, spring brake chamber line 24 and service brake chamber line 34 are all at atmospheric pressure.

The spring brake exhaust outlet 60 in housing 40 and the service brake exhaust outlet 62 in housing 40 vent the braking system so that it is at rest. In the at-rest position, spring brake line 24, which is attached to spring brake outlet 46 of valve housing 40, is vented by the quick release valve 50 to exhaust port 60, whereby the spring brake chambers are vented to the atmosphere so that the spring brakes are fully applied. The service brake line 34, which is attached to service brake outlet 48 of valve body 40, is vented by relay valve module 58 to exhaust port 62 so that the service brakes are not operable. It is to be appreciated that exhaust ports 60 and 62 may comprise the same physical port if so desired.

Figure 2B:
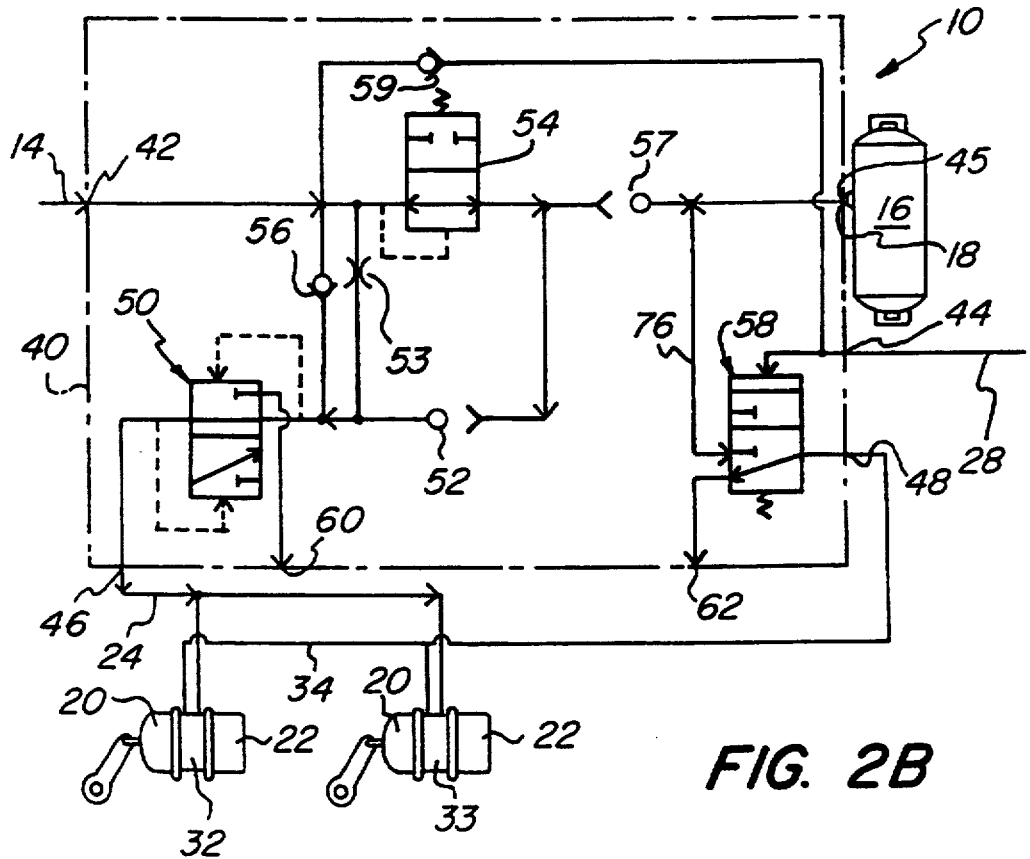
Figure 3B:
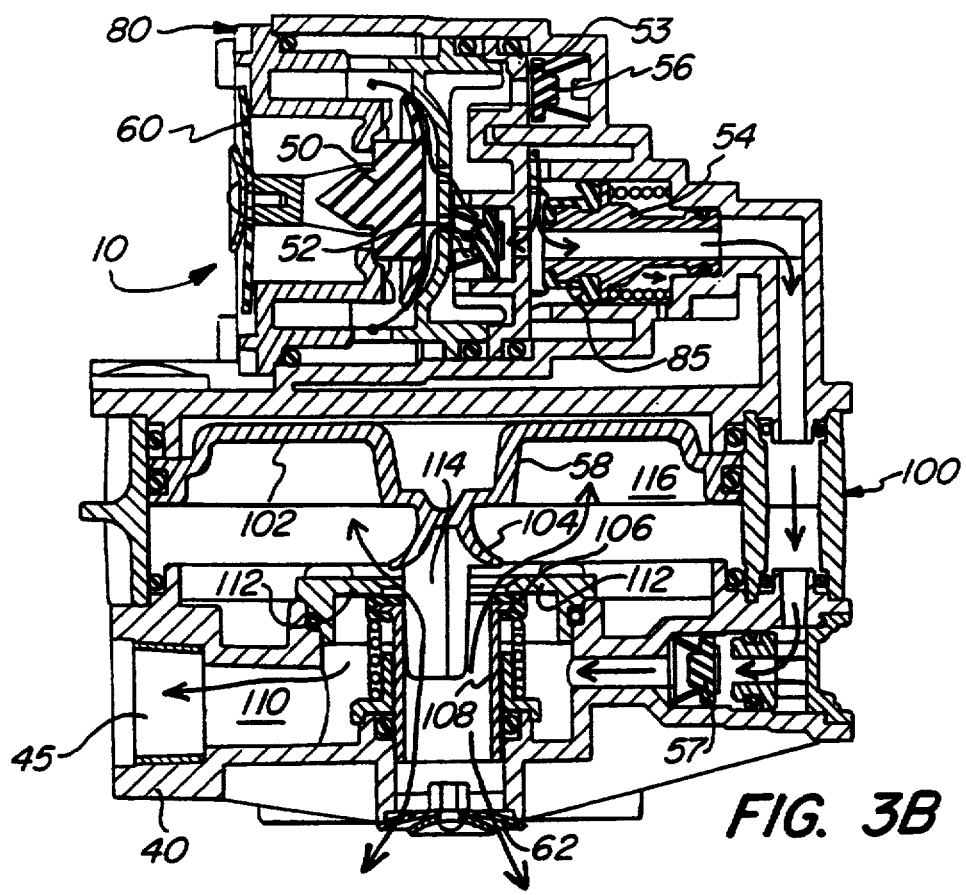

FIGS. 2B and 3B show full-function valve 10 after the pressure of the supply air in line 14 and supply air inlet 42 and the internal passageways has increased above a first predetermined pressure, typically about 70 psig. The biased pressure protection valve module 54 and first check valve 52, and reservoir check valve 57 are now open. Pressurized air is flowing into spring brake chambers 22 via one-way check valve 52, quick release valve 50, port 46 and line 24. Pressurized air is being delivered to reservoir 16 via one way check valve 57.

The spring brakes will release when the pressure in spring brake chambers 22 reaches a predetermined release pressure, which is typically between about 45–70 psig.

When the air pressure in the spring brake chambers equals the supply air pressure, one-way check valve 52 will close, retaining the pressure in spring brake chambers 22. This will isolate the pressure in the spring brake chambers 22 from the variations in air pressure in the reservoir portions of the trailer brake system. This will also prevent the pressurized air in the spring brake chambers 22 from escaping in the event of a failure of reservoir 16 or associated lines.

Figure 2C:
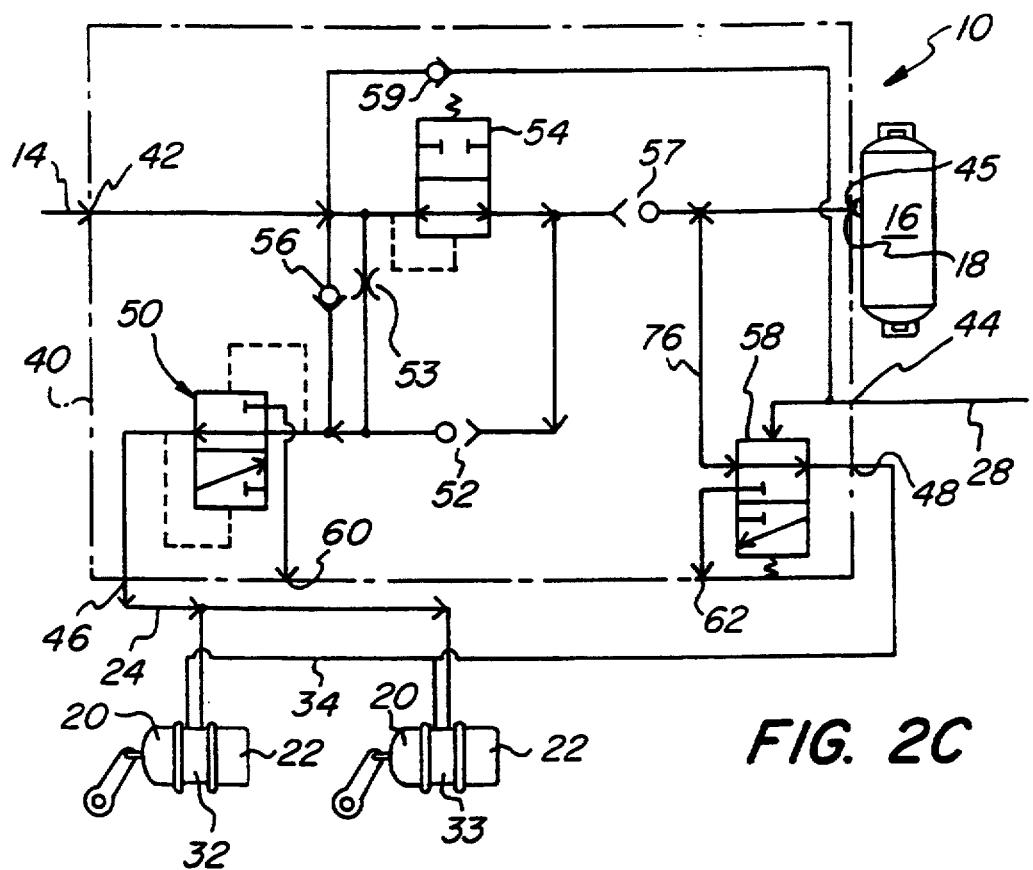
Figure 3C:
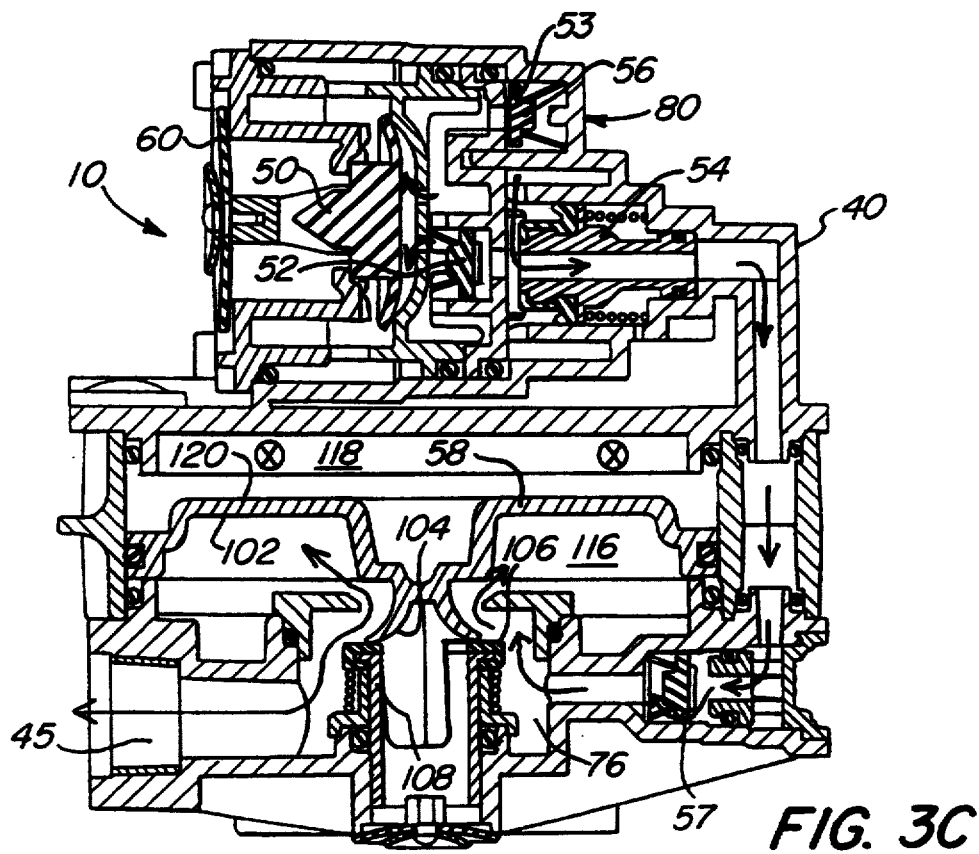
Figure 5:
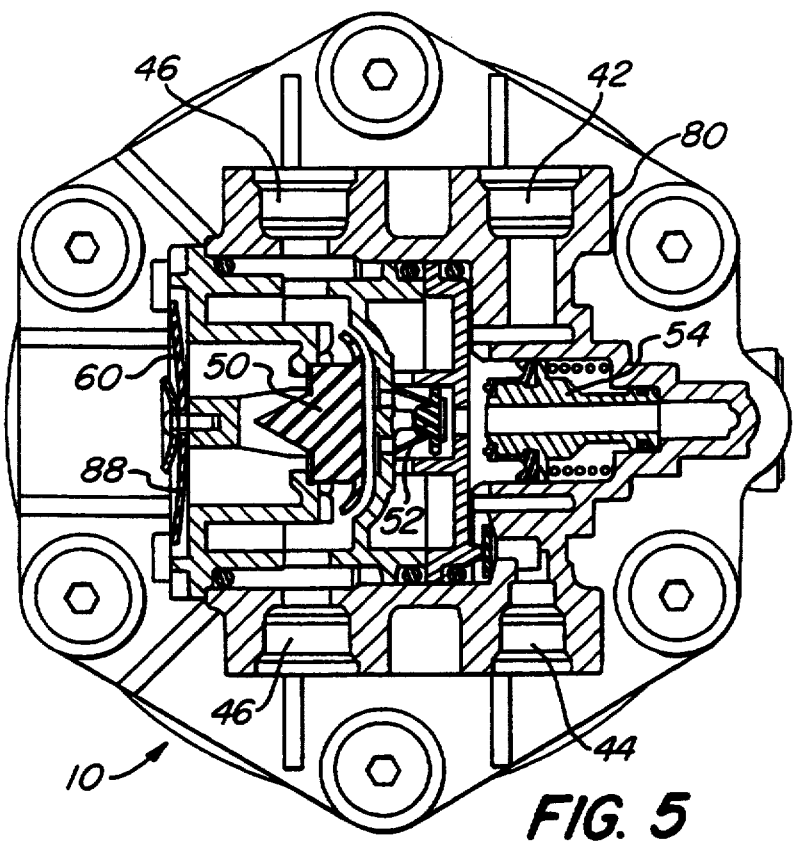
FIG. 5 is a cross-sectional top plan view of the full function valve shown in FIG. 3C.

FIGS. 2C, 3C, and 5 show full-function valve 10 when service brake control air is supplied via line 28 and control air inlet 44 to the piston of relay valve module 58. As shown, the module 58 shifts to communicate pressurized air from reservoir 16 (and supply air under some circumstances) to the service brake chambers 32 via line 18, port 45, passageway 76, module 58, port 48 and line 34. This results in application of the trailer service brakes in a known manner. It will be appreciated that relay valve module 58 may comprise other embodiments such as a diaphragm actuator or other devices such as are known in the art.

Figure 2D:
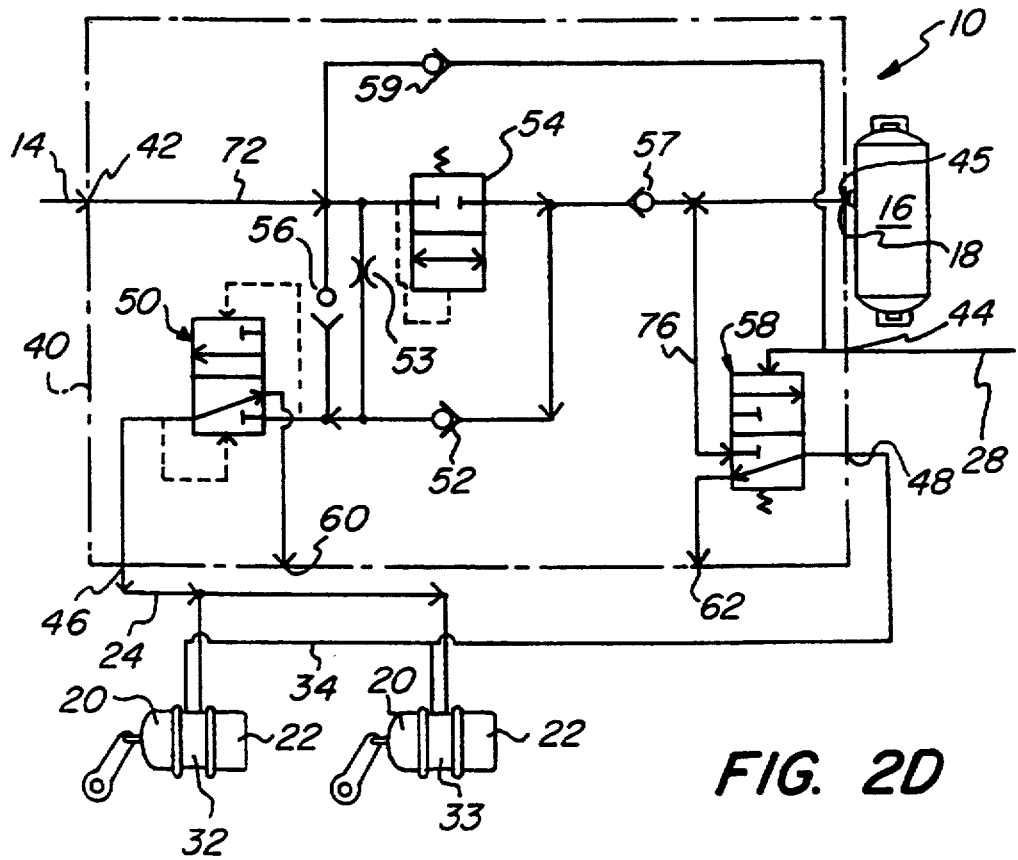
Figure 3D:
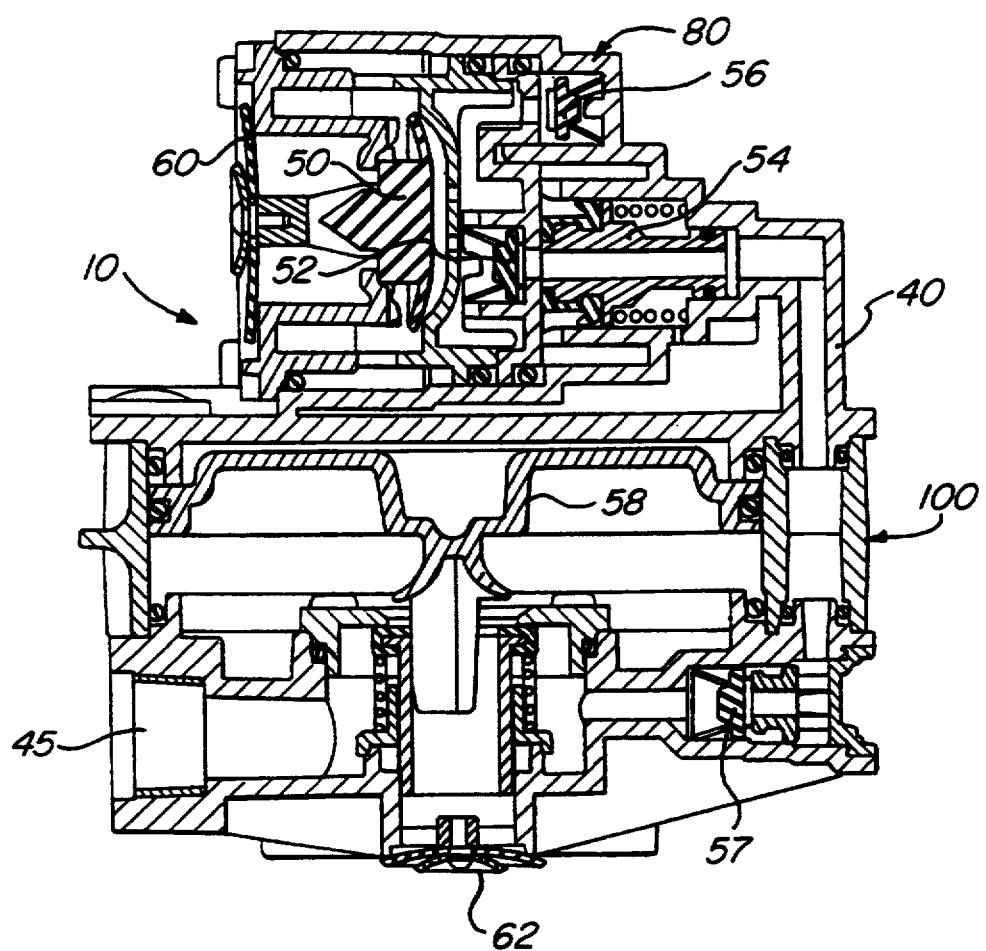

FIGS. 2D and 3D show full function valve 10 when there has been a failure or release of supply air. In such case, pressure protection valve 54, and reservoir check valve 57 supplying reservoir 16 will close to preserve service brake capability. Second check valve 56 will open to exhaust the inlet pressure at quick release valve 50 to begin exhausting the spring brake chambers 22 to permit the spring brakes to engage.

Figure 2E:
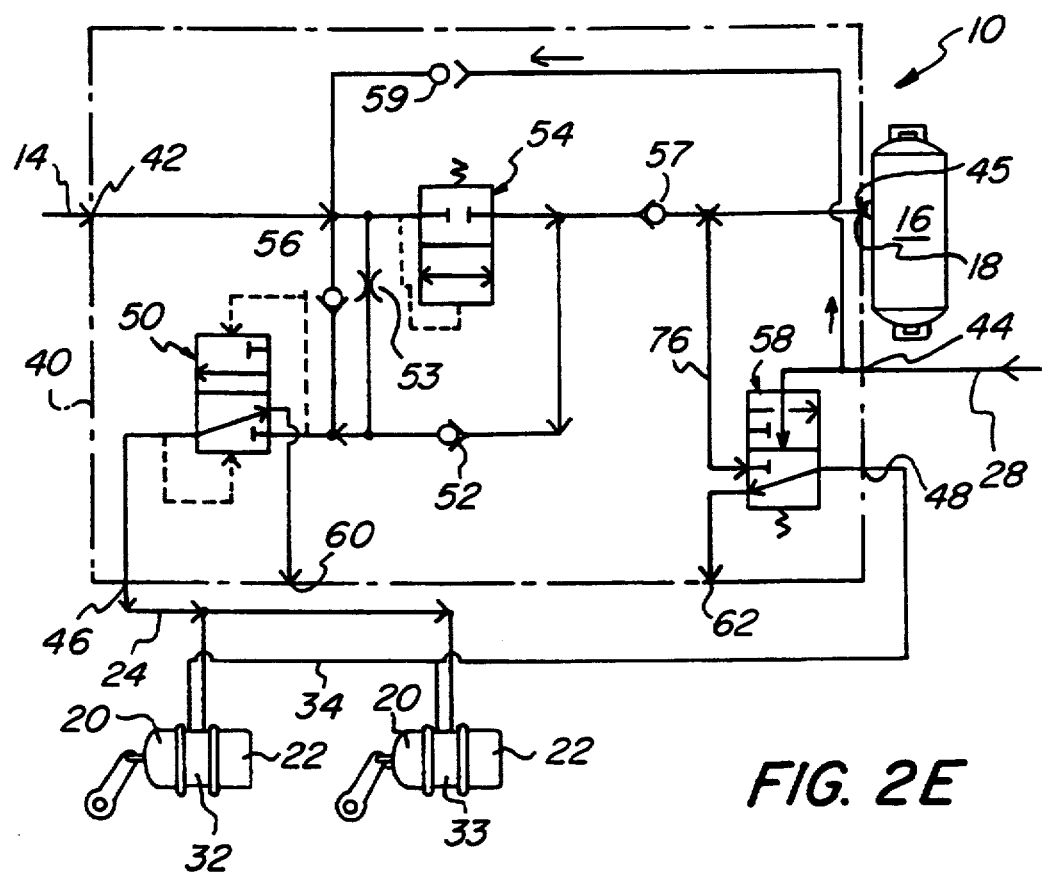
Figure 6:
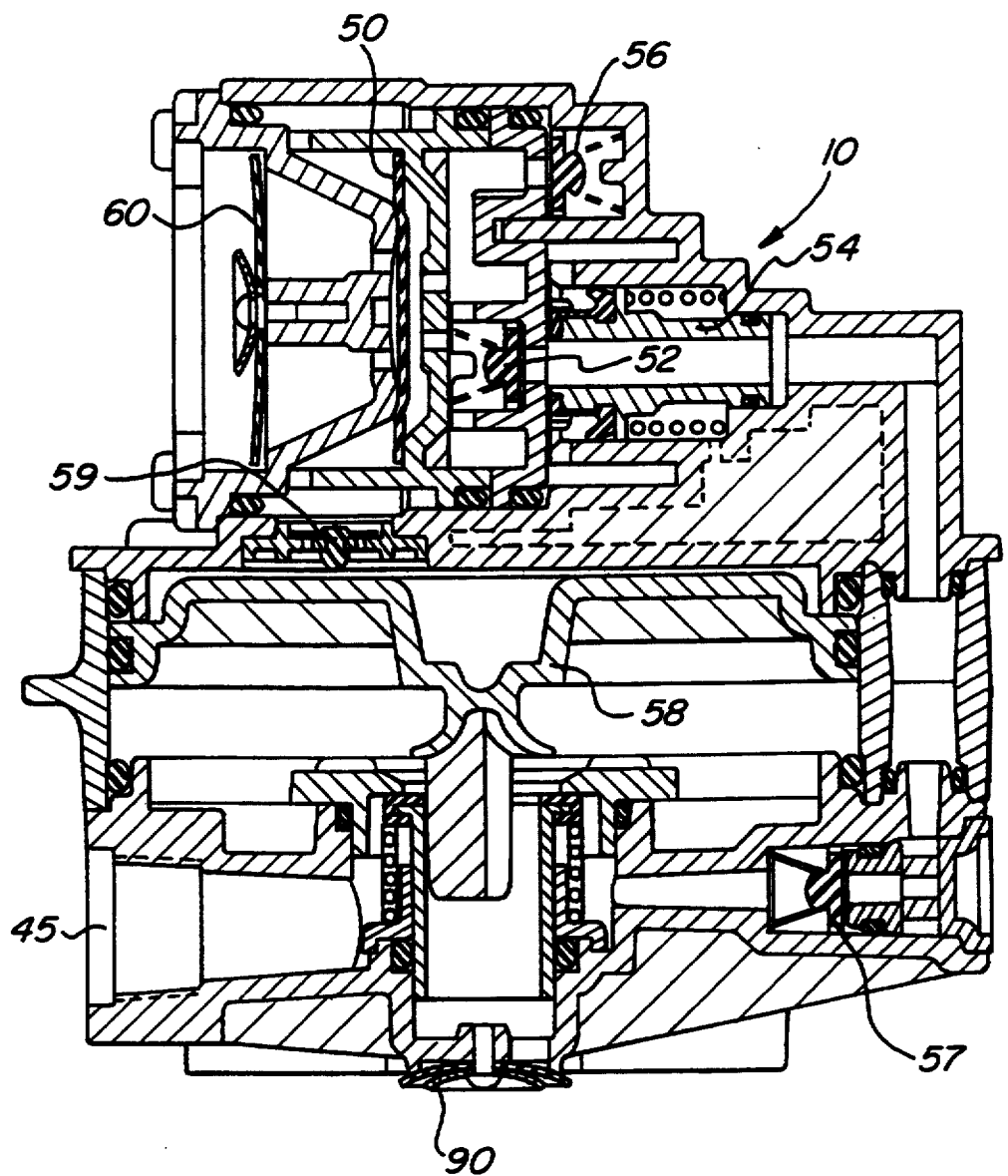
FIG. 6 is a cross-sectional view of a full function valve with an anti-compounding valve therein.

FIG. 2E shows the operation of anti-compounding valve 59, also shown in FIG. 6, which opens when the control air pressure exceeds the supply air pressure. This prevents the service brakes from operating when there is not enough supply air in the system to maintain full release of the spring brakes, to avoid inadvertent double braking system operation. As can be seen in FIG. 6, control air is vented by anti-compounding valve 59 to an area adjacent exhaust port 60, wherein the control air can be vented by deformation of quick release valve 50.

Referring now to FIGS. 3A-3D and 4, 5 and 6, a physical embodiment of a valve 10 in accordance with the invention is shown. In FIGS. 3A-3D, valve 10 comprises an upper section 80, also shown in FIGS. 4, 5 and 6, in which are located supply air inlet 42, control air inlet 44, and two spring brake outlets 46. Spring brake exhaust outlet 60 is also located in upper section 80.

Pressure protection valve 54 is located horizontally in the upper section 80 and includes a spring biased hollow piston 82 that has a sealing means such as a molded rubber seat 84 at one end that seats against a valve seat such as wall 86 to prevent fluid communication from supply air inlet 42 into the valve 10 until the supply air pressure is sufficient to open pressure protection valve 54. Supply air entering supply air inlet 42 enters chamber 87 and opens pressure protection valve 54 at a predetermined pressure, preferably about 70 psig.

First check valve 52 is located in upper section 80 directly across wall 86 from pressure protection valve 54 and through passageways is in fluid communication with adjacent quick release valve 50. Quick release valve 50 comprises a flexible rubber diaphragm having a flange 92 and a body 94 that fits into and seals against a sealing seat 96 opposite from communicating passageways leading from first check valve 52. Passageway 98 communicates with spring brake outlets 46. Second check valve 56 is located so supply air is provided thereto by a passageway leading from supply air inlet 42.

A passageway leads from pressure protection valve 54 down into a lower section 100 of valve 10. Lower section 100 comprises a housing for relay valve module 58, and includes the reservoir check valve 57.

Check valves 52, 56 and 57 are preferably all molded rubber check valves that will open when inlet side pressure exceeds outlet side pressure, but are normally biased to be closed. Other types of check valve, including conventional ball check valves may also be used in accordance with the invention.

Relay valve module 58 comprises a valve disc 102 having a central flange 104 sealable against a lip 106 of a tubular core 108. Core 108 is located in a passageway 110 between the reservoir check valve 57 and reservoir outlet 45. Core 108 is spring biased to normally seal core lip 106 against a partition 112 so that passageway 110 is separated from a passageway 114 connecting service brake exhaust 62 to service brakes via chamber 116.

Referring particularly to FIG. 3C, pressurized control air is supplied to chamber 118 at an upper face 120 of valve disc 102 to cause valve disc 102 and the central flange 104 to move downwardly to press against the core 108 to depress core 108 away from partition 112 to close the communicating passageways between the service brake outlet 48 (not shown) and the service brake exhaust 62 and to open communicating passageways from the reservoir outlet 45 and the reservoir check valve 57 to the service brake chambers 32 to thereby actuate the service brakes.

Referring now to all of FIGS. 1–6, the operation of valve 10 will be further described.

Supply air enters valve 10 via line 14, and port 42. Air pressure leaks through orifice 53 to cause quick release valve 50 to open, and to partially pressurize spring brake chambers 22, but not enough to cause the spring brakes to release. At about 70 psig, the pressure protection valve module 54 will open to allow pressurized air to enter the spring brake chambers 22 and to fill reservoir 16 via pressure protection valve module 54.

Pressurized air cannot go directly from the supply line 14 into the spring brake chambers 22 unless there is sufficient supply air pressure to also supply the service brakes, foreclosing the possibility of the trailer being moved without service brake capability.

The service brakes 32 are typically operable when reservoir 16 is charged to about 35 psig. The spring brakes will release when the system pressure reaches between about 45 to 70 psig. The operation of the service brakes is controlled by a foot pedal operating on relay valve module 58. Control air signals from the tractor enter relay valve module 58 and act on the piston in a conventional manner. This actuates the valve module 58, allowing air from reservoir 16 to fill the service brake chambers 32 of the brake actuators 20, resulting in brake application through conventional mechanical means.

In the event of a failure of trailer reservoir 16, the one-way check valve 52 will prevent the quick venting of air pressure in the spring brake chambers 22. This will allow the driver to pull the trailer off of the road using the tractor service brakes for control prior to complete application of the spring brakes. The orifice 53 will permit subsequent release of the spring brakes when they can be safely released.

Full-function valve 10 thus prevents drive-away prior to having adequate service brake capacity, yet provides for quicker drive-away than prior art simultaneous spring service brake and brake pressurization systems.

We claim:

1. A full function valve, comprising:
   a valve housing having a plurality of ports therein, said ports comprising a supply air inlet, a control air inlet, at least one spring brake outlet, at least one service brake outlet, a reservoir outlet, a spring brake exhaust, and a service brake exhaust; slid ports extending through an outer wall of said housing;
   a pressure protection valve in fluid communication with a passageway connected to said supply air inlet, said pressure protection valve being openable at a selected supply air pressure to provide fluid communication between said supply air inlet with a first check valve and a reservoir check valve;
   said first check valve being in fluid communication by a passageway to a quick release valve, said first check valve being openable when a pressure at an inlet side of said first check valve is greater than a pressure at an outlet side of said first check valve;
   said quick release valve having a spring brake pressurizing mode when a pressure at an inlet side thereof is greater than a pressure at an outlet side thereof to provide fluid communication between said supply air inlet with said spring brake outlet, said quick release valve having an exhaust mode when a pressure at an outlet side thereof is greater than a pressure at an inlet side thereof to provide fluid communication between said spring brake outlet with said spring brake exhaust;
   said reservoir check valve being located in fluid communication with said pressure protection valve and said reservoir outlet, said reservoir check valve being openable when a pressure at an inlet side thereof is greater than a pressure at an outlet side thereof to provide fluid communication between said supply air inlet with said reservoir outlet and a relay valve; and
   said relay valve being in fluid communication with said control air inlet, said relay valve being normally located to provide fluid communication between said service brake outlet and said service brake exhaust, and being operable when pressurized control air is supplied thereto to provide fluid communication between said reservoir and said service brake outlet; and
   a second check valve located in fluid communication with said supply air inlet and said inlet side of said quick release valve.

2. A full function valve in accordance with claim 1, further comprising an orifice located in fluid communication between said supply air inlet and said inlet side of said quick release valve, said orifice being sized to provide sufficient supply air to open said quick release valve to a pressurized position, to provide a partial flow of supply air to said spring brake outlet.

3. A full function valve in accordance with claim 2, wherein said orifice comprises an aperture in a valve seat of said second check valve.

4. A full function valve in accordance with claim 1, further comprising an anti-compounding valve located in a passageway connecting said control air inlet and said supply air inlet, said anti-compounding valve being openable to vent control air pressure when supply air is insufficient to open said pressure protection valve.

5. A full function valve in accordance with claim 1, further comprising an anti-compounding valve located in a passageway connecting said control air inlet and said supply air inlet, said anti-compounding valve being openable to vent control air pressure when supply air is insufficient to open said pressure protection valve.

6. A full function valve in accordance with claim 1, wherein said relay valve comprises a valve disc having a central flange sealable against a lip of a tubular core, said core located in a passageway between said reservoir check valve and said reservoir outlet and being spring biased to normally seal said core lip against a partition wherein said passageway from said reservoir check valve to said reservoir outlet is separated from a passageway for connecting to said service brake outlet, and wherein pressurized control air is supplied to an upper face of said valve disc to cause said valve disc and central flange to move downwardly to press against said tubular core to depress said core away from said partition to close the normal connection between the service brake outlet and the service brake exhaust and to open a passageway connecting said reservoir outlet and said reservoir check valve to a service brake chamber through said opened passageway to actuate a service brake.

7. A full function valve, comprising:
   a valve housing having a plurality of ports therein, said ports comprising a supply air inlet, a control air inlet, at least one spring brake outlet, at least one service brake outlet, a reservoir outlet, a spring brake exhaust, and a service brake exhaust; said ports extending through said housing;
   a normally closed pressure protection valve in fluid communication with a passageway connected to said supply air inlet, said pressure protection valve being openable at a selected supply air pressure to connect said supply air inlet to a normally closed first check valve and to a passageway leading to a normally closed reservoir check valve;
   said first check valve being in fluid communication by passageways to a quick release valve, said first check valve being openable when a pressure at an inlet side of said first check valve is greater than a pressure at an outlet side of said first check valve;
   said quick release valve being operable when a pressure at an inlet side thereof is greater than a pressure at an outlet side thereof to connect said supply air inlet to be in fluid communication with said spring brake outlet and being operable in an exhaust mode when a pressure at an outlet side thereof is greater than a pressure at an inlet side thereof to connect said spring brake outlet with said spring brake exhaust;
   said reservoir check valve being located in fluid communication by passageways with said pressure protection valve and said reservoir outlet, said reservoir check valve being openable when a pressure at an inlet side thereof is greater than a pressure at an outlet side thereof to connect said supply air inlet to said reservoir outlet and to a relay valve;
   said relay valve being in fluid communication with said control air inlet, said relay valve being normally located to connect said service brake outlet and said service brake exhaust, and being operable when pressurized control air is supplied thereto to open a passageway to connect said reservoir to said service brake outlet;
   a second normally closed check valve being located in fluid communication with said supply air inlet and said inlet side of said quick release valve; and
   an orifice located in fluid communication between said supply air inlet and said inlet side of said quick release valve, said orifice being sized to provide sufficient supply air to open said quick release valve to a pressurized position, to provide a partial flow of supply air to said spring brake outlet.

8. A full function valve in accordance with claim 7, wherein said orifice provides a partial supply of air flow to said spring brake outlet sufficient to partially pressurize a spring brake chamber without releasing a spring brake prior to opening of the pressure protection valve and pressurization of said reservoir with supply air.

9. A full function valve in accordance with claim 8, wherein said orifice permits pressurization of spring brake chambers to release said spring brakes after the spring brakes are applied subsequent to a reservoir failure.

10. A full function valve in accordance with claim 9, wherein said orifice comprises an aperture in a valve seat of said second check valve.

11. A full function valve in accordance with claim 10, further comprising an anti-compounding valve located in a passageway connecting said control air inlet and said supply air inlet, said anti-compounding valve being openable to vent said control air pressure when supply air is insufficient to open said pressure protection valve.

12. A full function valve in accordance with claim 11, wherein said relay valve comprises a valve disc having a central flange sealable against a lip of a tubular core, said core located in said passageway between said reservoir check valve and said reservoir outlet and being spring biased to normally seal said core lip against a partition wherein said passageway from said reservoir check valve to said reservoir outlet is separated from said passageway connecting to said service brake outlet, and wherein control air is supplied to an upper face of said valve disc to cause said valve disc and central flange to move downwardly to press against said tubular core to depress said core away from said partition to close the normal connection between the service brakes outlet and the service brake exhaust and to create an open passageway between said reservoir outlet and said service brake outlet to actuate the service brake.

13. A brake system comprising:
   a full function valve, including
      a valve housing having a plurality of ports therein, said ports comprising a supply air inlet, a control air inlet, at least one spring brake outlet, at least one service brake outlet, a reservoir outlet, a spring brake exhaust, and a service brake exhaust; said ports extending through said housing;
      a pressure protection valve in fluid communication with a passageway connected to said supply air inlet, said pressure protection valve being openable at a selected supply air pressure to connect said supply air inlet to a first check valve and to a passageway leading to a reservoir check valve;
      said first check valve being in fluid communication by passageways to a quick release valve, said first check valve being openable when a pressure at an inlet side of said first check valve is greater than a pressure at an outlet side of said first check valve;
      said quick release valve being operable when a pressure at an inlet side thereof is greater than a pressure at an outlet side thereof to connect said supply air inlet to be in fluid communication with said spring brake outlet and being operable in an exhaust mode when a pressure at an outlet side thereof is greater than a pressure at an inlet side thereof to connect said spring brake outlet with said spring brake exhaust;
      said reservoir check valve being located in fluid communication by passageways with said pressure protection valve and said reservoir outlet, said reservoir check valve being openable when a pressure at an inlet side thereof is greater than a pressure at an outlet side thereof to connect said supply air inlet to said reservoir outlet and to a relay valve;
      said relay valve being in fluid communication with said control air inlet, said relay valve being normally located to connect said service brake outlet and said service brake exhaust, and being operable when pressurized control air is supplied thereto to open a passageway to connect said reservoir to said service brake outlet;

a second check valve being located in fluid communication with said supply air inlet and said inlet side of said quick release valve;

an air reservoir for containing pressurized air, said air reservoir being operably connected to said reservoir outlet;

a source of pressurized supply air operably connected to said supply air inlet;

a source of pressurized control air operably connected to said control air inlet;

a service brake chamber for operation of service brakes operably connected to said service brake outlet; and a spring brake chamber for operation of spring brakes operably connected to said spring brake outlet.

14. A brake system in accordance with claim 13, further comprising an anti-compounding valve located in a passageway connecting said control air inlet and said supply air inlet, said anti-compounding valve being openable to vent said control air pressure when supply air is insufficient to open said pressure protection valve.

15. A brake system in accordance with claim 14, further comprising:

an orifice located in fluid communication between said supply air inlet and said inlet side of said quick release valve, said orifice being sized to provide sufficient supply air to open said quick release valve to a pressurized position, to provide a partial flow of supply air to said spring brake outlet.

16. A brake system in accordance with claim 15, wherein said orifice provides a partial supply of air flow to said spring brake outlet sufficient to partially pressurize a spring brake chamber without releasing a spring brake prior to opening of the pressure protection valve and pressurization of said reservoir with supply air.

17. A brake system in accordance with claim 16, wherein said orifice permits pressurization of spring brake chambers to release said spring brakes after the spring brakes are applied subsequent to a reservoir failure.

18. A brake system in accordance with claim 17, wherein said orifice comprises an aperture in a valve seat of said second check valve.

* * * * *

UNITED STATES PATENT AND TRADEMARK OFFICE
CERTIFICATE OF CORRECTION

PATENT NO. : 5,417,479
DATED : May 23, 1995
INVENTOR(S) : Steven D. Wallestad; Robert L. Koelzer It is certified that error appears in the above-identified patent and that said Letters Patent is hereby corrected as shown below:

Column 1, line 45; "Tannin" should be --Fannin--.

Column 7, line 55; "slid" should be --said--.

Signed and Sealed this

Eighth Day of August, 1995

Attest:

BRUCE LEHMAN

Attesting Officer      Commissioner of Patents and Trademarks